United States Patent
Deker

(10) Patent No.: US 8,170,727 B2
(45) Date of Patent: May 1, 2012

(54) METHOD FOR CALCULATING AN APPROACH TRAJECTORY OF AN AIRCRAFT TO AN AIRPORT

(75) Inventor: Guy Deker, Cugnaux (FR)

(73) Assignee: Thales (FR)

( * ) Notice: Subject to any disclaimer, the term of this patent is extended or adjusted under 35 U.S.C. 154(b) by 985 days.

(21) Appl. No.: 12/103,745

(22) Filed: Apr. 16, 2008

(65) Prior Publication Data
US 2009/0043434 A1   Feb. 12, 2009

(30) Foreign Application Priority Data
Apr. 24, 2007  (FR) ..................................... 07 02971

(51) Int. Cl.
*G05D 1/00* (2006.01)
(52) U.S. Cl. .............. 701/3; 701/16; 244/180; 244/182; 244/185
(58) Field of Classification Search .................... 701/16, 701/3; 244/180, 182, 185; G05D 1/00
See application file for complete search history.

(56) References Cited

U.S. PATENT DOCUMENTS

| | | | |
|---|---|---|---|
| 3,875,379 A | | 4/1975 | Vietor |
| 4,368,517 A | * | 1/1983 | Lovering ....................... 701/16 |
| 6,173,219 B1 | * | 1/2001 | Deker .............................. 701/3 |
| 6,181,987 B1 | * | 1/2001 | Deker et al. ...................... 701/3 |
| 6,571,171 B1 | * | 5/2003 | Pauly ............................ 701/528 |
| 7,611,098 B2 | * | 11/2009 | Van Boven .................... 244/183 |
| 7,647,140 B2 | * | 1/2010 | Demortier et al. .............. 701/16 |
| 2002/0089433 A1 | * | 7/2002 | Bateman et al. ............. 340/970 |
| 2002/0158168 A1 | | 10/2002 | Greeme |
| 2004/0044446 A1 | * | 3/2004 | Staggs ........................ 701/16 |
| 2004/0078136 A1 | * | 4/2004 | Cornell et al. ................ 701/120 |
| 2004/0167685 A1 | * | 8/2004 | Ryan et al. ...................... 701/16 |
| 2005/0261814 A1 | * | 11/2005 | Ryan et al. ...................... 701/16 |
| 2006/0195235 A1 | * | 8/2006 | Ishihara et al. .................. 701/16 |
| 2009/0048724 A1 | * | 2/2009 | Caule ............................. 701/16 |
| 2010/0252674 A1 | * | 10/2010 | Lang .............................. 244/36 |

\* cited by examiner

*Primary Examiner* — Tuan C. To
(74) *Attorney, Agent, or Firm* — Lowe Hauptman Ham & Berner, LLP

(57) ABSTRACT

The invention relates to a method for calculating an approach trajectory of an aircraft (200) to an airport The aircraft is slaveable in terms of trajectory, thrust and/or speed. The aircraft is able to advance at reduced engine revs. The airport has a runway The approach trajectory terminates in an impact point (205) on the runway and has a high-altitude descent segment (217) and an intermediate geometric segment (207), to which the aircraft is slaved in terms of trajectory and speed. A step of calculating a final approach segment (208) at reduced engine revs and a landing segment is performed with a greater thrust than the reduced revs so as to prepare a possible go-around (209), to which the aircraft is slaved in terms of thrust and speed.

14 Claims, 5 Drawing Sheets

METHOD FOR CALCULATING AN APPROACH TRAJECTORY OF AN AIRCRAFT TO AN AIRPORT

RELATED APPLICATIONS

The present application is based on, and claims priority from, French Application Number 07 02971, filed Apr. 24, 2007, the disclosure of which is hereby incorporated by reference herein in its entirety.

FIELD OF THE INVENTION

The invention relates to flight management systems and, more particularly to the calculation of an approach trajectory of an aircraft to an airport.

BACKGROUND OF THE INVENTION

Flight safety is the first priority of airlines, followed by in-flight comfort and operating costs. Another constraint occurs today with the environment: reduction of impacts in terms of noise for the local residents and emission of pollutants.

Currently, descent trajectories generally terminate at constant slope at the time of landing so as to be compatible with the landing means which are materially defined with a constant slope setting (or "Glide slope" as it is known). These trajectories are compatible with all aeroplanes a priori and furthermore make it possible to maintain an appropriate speed for landing. FIGS. 1a and 1b present two examples of approach trajectories according to the known art. The first exemplary approach trajectory, presented in FIG. 1a, comprises a high-altitude descent segment 101, a series of intermediate geometric segments 102 (related to compliance with altitude and speed constraints for the end of the descent) and an approach segment 103 making it possible to stabilize the aeroplane on the runway axis 104 and according to a final approach plane at constant slope 105. This approach segment generally begins in the prior art with a deceleration leg 106. The second exemplary approach trajectory, presented in FIG. 1b, is a recent advance making it possible to dispense with this deceleration leg 106 in the approach segment 103. This type of approach is known by the term CDA for Continuous Descent Approach. Each of these profiles integrates the speed profile matched to the configuration extensions (slats, flaps, undercarriage) desired for the landing.

However, the final segment has a very low slope α, generally of the order of 3°, imposed by the customary landing procedures. This induces an approach trajectory that is close to the ground for quite some time, this being detrimental for the local residents as regards noise. Moreover, maintaining a constant low slope with an approach speed suited to the aeroplane and to the runway imposes an increase in the thrust generating at one and the same time noise, overconsumption and pollutants.

SUMMARY OF THE INVENTION

The invention is aimed at alleviating the problems cited previously by proposing a method making it possible to make approaches and landings which reduce the time spent close to the ground by virtue of a higher slope and which maximizes the use of idling (reduced thrust). This has the effect of limiting the noise (since the approach is steeper), fuel consumption and therefore emissions of pollutants. Moreover the engines are thus exerted less and their lifetime lengthened.

The method according to the invention occurs during the approach phase and consists in calculating an initial approach at constant slope compatible with possible constraints regarding altitude (obstacles, traffic separation), speed and/or arrival time up to a point where the aeroplane completely reduces then maintains its engine revs at idle (most reduced) while ensuring and controlling a constant speed suited to landing with no risk of stalling. The point of switchover to reduced engine revs is calculated in such a way that the trajectory of the aircraft touches the runway in a safe zone, defined between a minimum impact point and a maximum impact point.

The method according to the invention includes the permanent monitoring of the impact point (landing) in the safe zone. If the impact point moves and exits the safe zone, a recapture profile is instantaneously recalculated and a mode reversion makes it possible to recapture this profile and therefore to ensure that the safe impact zone of the runway is attained with a speed and a slope fixed until the aircraft is again in a condition of landing at reduced revs. If the impact point moves for more than a certain time (so as to confirm the problem) after the zone, the system proposes a go-around to the pilot so as to interrupt the landing rendered risky by too short an available runway distance.

It is of foremost importance to take the wind into account. The calculation of the impact point takes into account the real wind sensed by the aeroplane and if the information is available, the wind information at the level of the runway and along the points of the approach, dispatched through a data link from the ground to the aircraft. So long as the aircraft has not reached the impact point, the refreshing of this point with the real wind conditions is done periodically (for example every second). The monitoring of the impact point also takes into account the measured wind.

The point of switchover to reduced engine revs is at a height of the order of 1500 to 3000 feet depending on the types of approach so as not to disturb the traffic but also so that the impact on the environment is noticeable. It may be considered that above 3000 feet, the noise is not discriminating.

A first advantage is the increased sound comfort both as regards the local residents, and also as regards the passengers. Specifically the noise in the cabin is reduced since there is neither any acceleration nor deceleration.

A second advantage is the reduction in fuel consumption therefore fewer pollutants are emitted in particular in the low layers. This effect is all the more appreciable when there is an inversion layer which holds the gases captive in proximity to the ground. Moreover, the cost price of the flight is a little lower.

Another advantage of the invention is that it requires only the modification of the software part of the existing flight management systems. In particular, no modification of the automatic pilot or of the auto-throttle regulating the thrust is required.

For this purpose, the subject of the invention is a method for calculating an approach trajectory of an aircraft to a runway of an airport, the aircraft being slaveable in terms of trajectory and speed, in terms of trajectory and thrust or in terms of thrust and speed, the aircraft being able to advance at reduced engine revs, the approach trajectory terminating in an impact point on the runway and comprising a high-altitude descent segment constructed on the basis of a thrust and speed setpoint, and an intermediate geometric segment constructed on the basis of speed and slope setpoints appending altitude constraints, to which the aircraft is slaved in terms of trajectory and thrust and then trajectory and speed, wherein comprising a step of calculating a final approach segment at reduced engine revs and a landing segment preparing a possible go-around, to which the aircraft is slaved in terms of thrust and speed.

Advantageously, the method for calculating an approach trajectory according to the invention furthermore comprises a step of automatic monitoring of the position of the impact point on the runway, the step comprising: real-time evaluation of the position and speed of the impact as a function of the position and current speed of the aircraft, propagated up to the runway with the conditions regarding wind, mode of guidance and current and envisaged aircraft performance, such as the variations in speed and in configuration of slats, flaps and undercarriage with a view to landing.

Advantageously, the method for calculating an approach trajectory according to the invention furthermore comprises a step of calculating a minimum impact point, the runway comprising a runway threshold, the runway threshold being a limit point onwards of which the aircraft can land without risk, the minimum impact point being positioned beyond the runway threshold at a safety distance.

Advantageously, the method for calculating an approach trajectory according to the invention furthermore comprises a step of calculating a maximum impact point, the runway comprising an extreme limit point, the extreme limit point being defined as the most distant impact point on the runway in the direction of landing in service below which the aircraft can land, brake and disengage the runway without risk, the maximum impact point being situated on the runway upstream of the extreme limit point at a safety distance.

Advantageously, the method for calculating an approach trajectory according to the invention furthermore comprises a step of emitting an alarm for the crew when the impact point exits a safe zone or if the speed of the aircraft does not make it possible to disengage the runway in safety under the current braking conditions, the safe zone being defined between the points of minimum and maximum impact and it furthermore comprises the active preparation of the aircraft for a go-around.

Advantageously, the method for calculating an approach trajectory according to the invention furthermore comprises a step of calculating a point of switchover to reduced engine revs, the aircraft advancing under meteorological conditions defined by a maximum wind and a minimum wind, the point of switchover to reduced engine revs being defined by the intersection between:
  a descent trajectory at reduced engine revs with a maximum wind and according to the approach speed suited to this wind, having the minimum impact point as point of impact with the runway and,
  a descent trajectory at reduced engine revs with a minimum wind and according to the approach speed suited to this wind, having the maximum impact point as point of impact with the runway.

Advantageously, when the point of switchover to reduced engine revs cannot be calculated or exceeds a maximum height of reduction, this switchover point is positioned at the intersection between:
  a horizontal straight line situated at the maximum height of reduction and,
  a descent trajectory taking account of the approach speed profile and also of wind information, having a middle impact point as point of impact with the runway, the middle impact point being situated midway from the points of minimum and maximum impact, or being calculated between these points of minimum and maximum impact as a function of the mean value of the wind gusts if it has been possible to calculate this mean according to a short time history.

Advantageously, the method for calculating an approach trajectory according to the invention furthermore comprises a step of calculating a go-around preparation point placed towards the end of the final approach segment. The go-around preparation point makes it possible to establish higher engine revs making it possible to go-around more rapidly, reducing the time loss related to the inertia of the engines.

Advantageously, the method for calculating an approach trajectory according to the invention furthermore comprises a step of automatic guidance about the approach trajectory.

Advantageously, the method for calculating an approach trajectory according to the invention furthermore comprises a step of determining the type of landing as a function of the aircraft, the characteristics of the runway, the possible local characteristics such as the presence of obstacles and the meteorological conditions, in particular the meteorological minima, making it possible to know whether the landing comprises a precision approach or a non-precision approach.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1A:
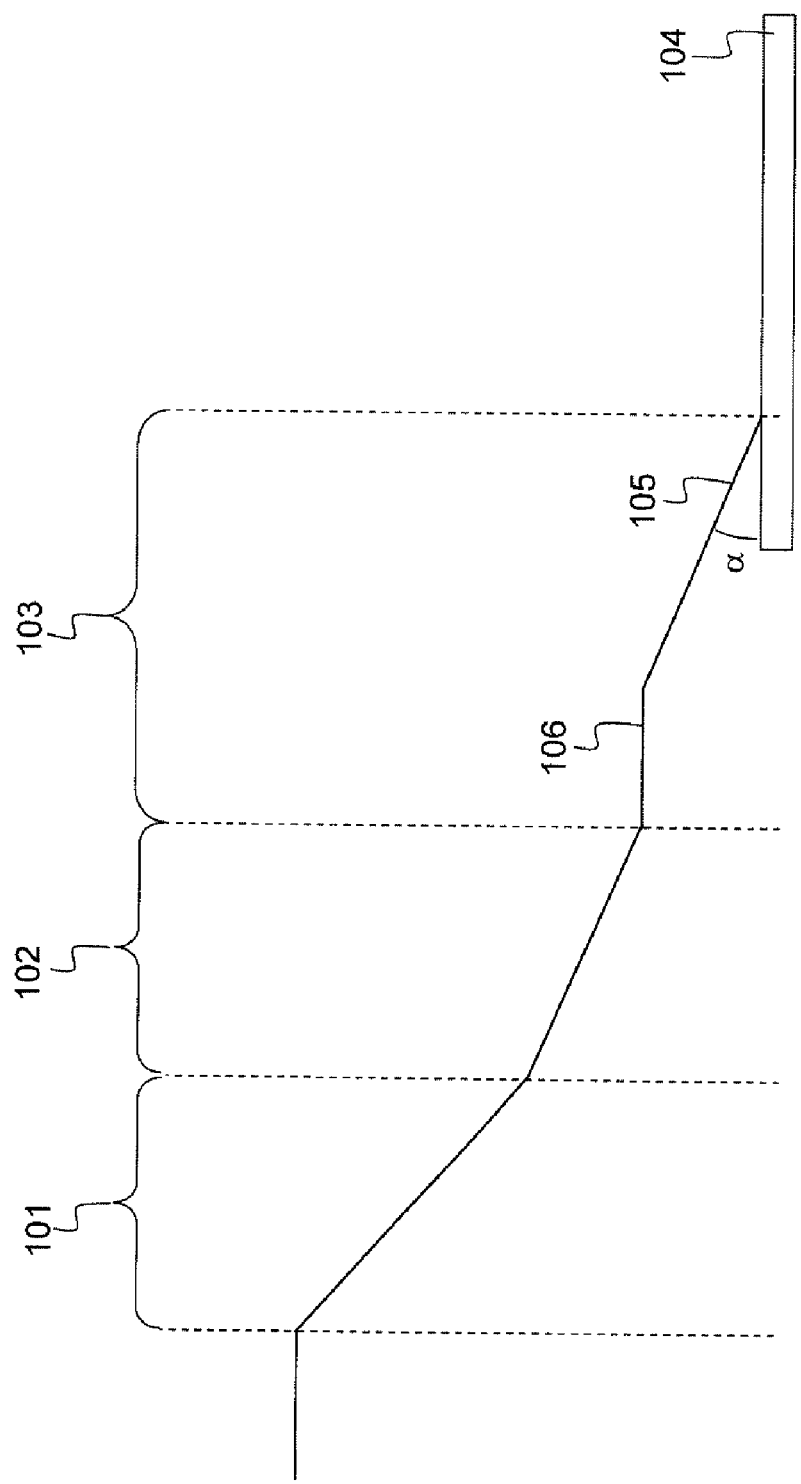
FIG. 1a represents a first exemplary approach trajectory according to the known art.
Figure 1B:
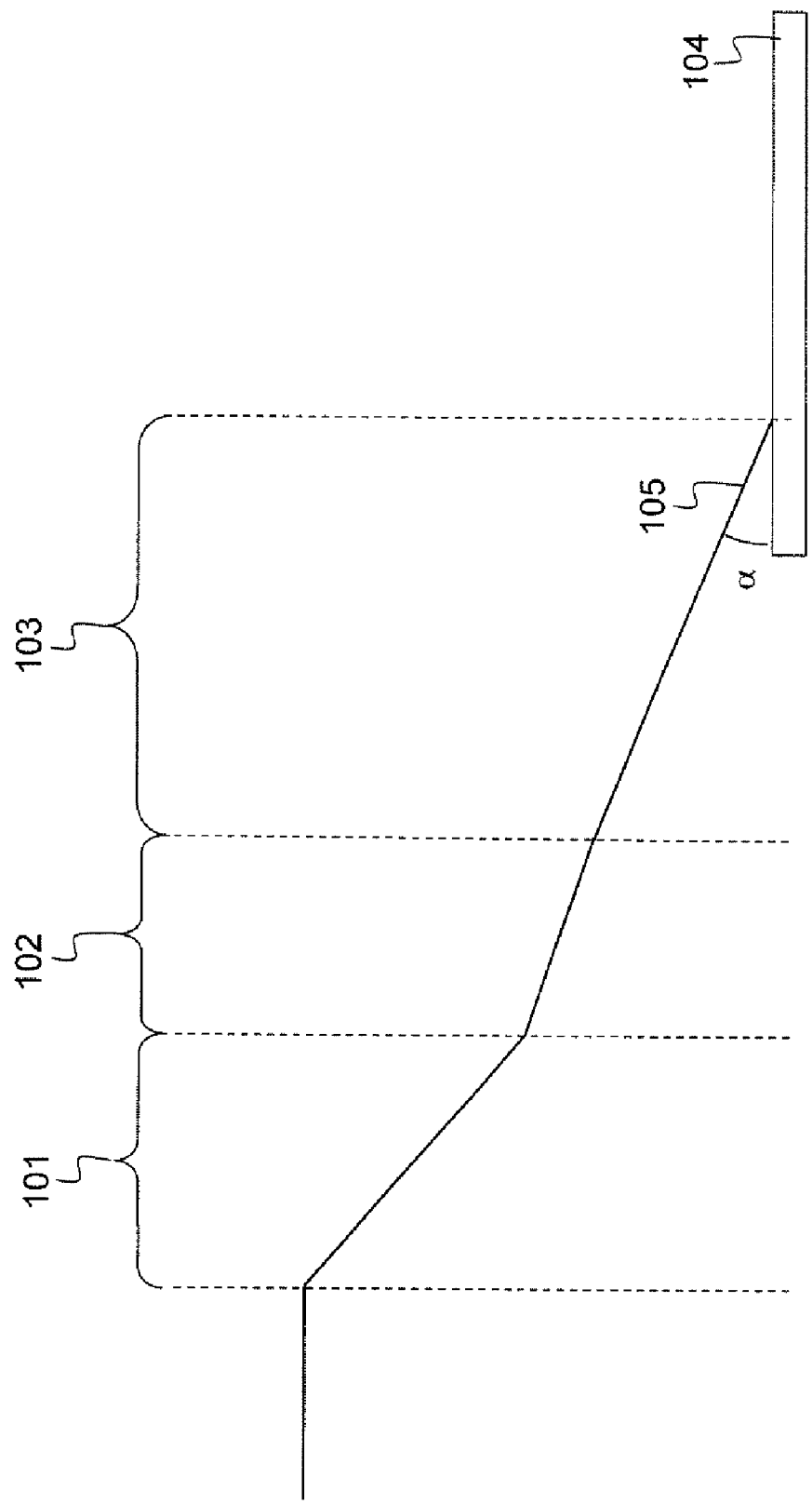
FIG. 1b represents a second exemplary approach trajectory according to the known art.

The present invention relates to a method for calculating an approach trajectory of an aircraft 200 to an airport. The airport comprises a runway 216. The runway 216 is characterized by two extreme points: a runway threshold 213, before which no impact is possible without danger, and a limit extreme point 214, beyond which no impact is possible without danger to terminate the landing and disengage to the exit linkway with a stabilized and controlled speed. Beyond the limit extreme point 214, the aircraft no longer has enough distance to brake before the runway extremity or the exit linkway. In an arbitrary manner, the limit extreme point 214 is fixed at 25% of the runway length starting from the threshold. However, this value can be modified depending on need and local conditions.

A first segment is a high-altitude descent segment 217. The high-altitude descent segment 217 starts from a point at which descent begins (called "Top Of Descent"). According to the prior art, this segment is traversed at reduced engine thrust (Idle) and with the speed requested by the pilot to optimize fuel consumption.

A second segment is an intermediate geometric segment 207. The intermediate geometric segment 207 generally consists of segments linking altitude and/or speed constraints imposing a greater thrust than the reduced thrust and the maintenance of a constant speed. The speed constraints will be complied with through decelerations performed according to a lower slope making it possible to continue the descent with a constant distribution between loss of kinetic energy (deceleration) and loss of potential energy (drop rate) according to the current state of the art.

The aircraft 200 is slaved in terms of trajectory and thrust on the first segment 217 (so as to optimize the descent at idle revs) while it is slaved in terms of trajectory and speed on the second segment 207 (so as to maintain good precision of vertical profile and speed tracking).

A third segment is a final approach segment 208. The final approach segment 208 is traversed by the aircraft 200 at reduced thrust, that is to say close to 30% of revs N1 (unit corresponding to the number of revolutions per minute of a stage of an engine). This segment is traversed with a configuration of slats and flaps which is optimized to reduce noise on landing (of the order of one notch less than the normal configuration) at least as long as this is possible depending on the runway distance available. This configuration has to be defined according to each aircraft. The final approach segment 208 is defined between a point of switchover 202 to reduced engine revs and a go-around preparation point 203.

A fourth segment is a landing segment preparing for go-around 209 (in the event of interrupted landing). The landing segment preparing for go-around 209 is traversed by the aircraft 200 with an increased thrust (of the order of 50% of revs N1) calculated in such a way that the duration of accelerating up to the full thrust for go-around does not take more than a safety duration (because of the reaction inertia of the engines). This safety duration is generally less than 10 to 15 seconds. The landing segment preparing for go-around 209 is defined between the go-around preparation point 203 and the impact point 205 with the runway 216.

The aircraft 200 is slaved in terms of thrust and speed on the third segment 208 and the fourth segment 209.

The method according to the invention furthermore comprises a step of calculating a minimum impact point 204 generally positioned at the level of the runway threshold 213 with a safety margin.

The method according to the invention furthermore comprises a step of calculating a maximum impact point 206. The maximum impact point 206 is placed at the level of an extreme limit point 214 with a safety margin.

The points of minimum 204 and maximum 206 impact define a safe impact zone 215.

The method according to the invention furthermore comprises a step of calculating a point of switchover 202 to reduced engine revs defined by the intersection between:
  a descent trajectory 210 at reduced engine revs with a maximum wind (always known and advised by the controller or observed onboard over for example the last three minutes when the information is available) and according to the approach speed suited to this wind, having the minimum impact point 204 as point of impact with the runway,
  a descent trajectory 212 at reduced engine revs with a minimum wind (always known and advised by the controller or observed onboard over for example the last three minutes when the information is available) and according to the approach speed suited to this wind, having the maximum impact point 206 as point of impact with the runway.

Figure 2:
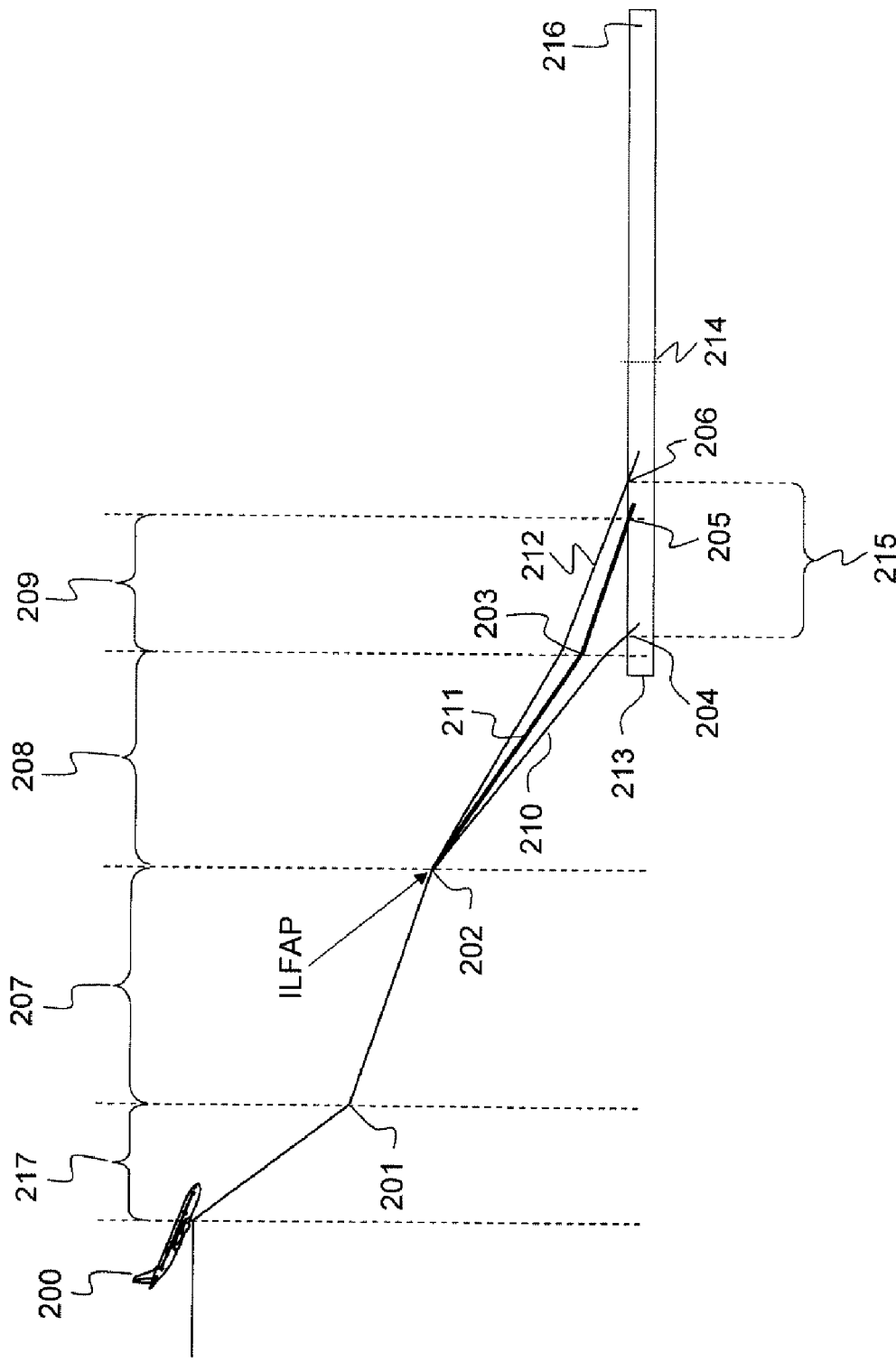
FIG. 2 presents a first exemplary approach trajectory calculated with the method according to the invention.
Figure 3:
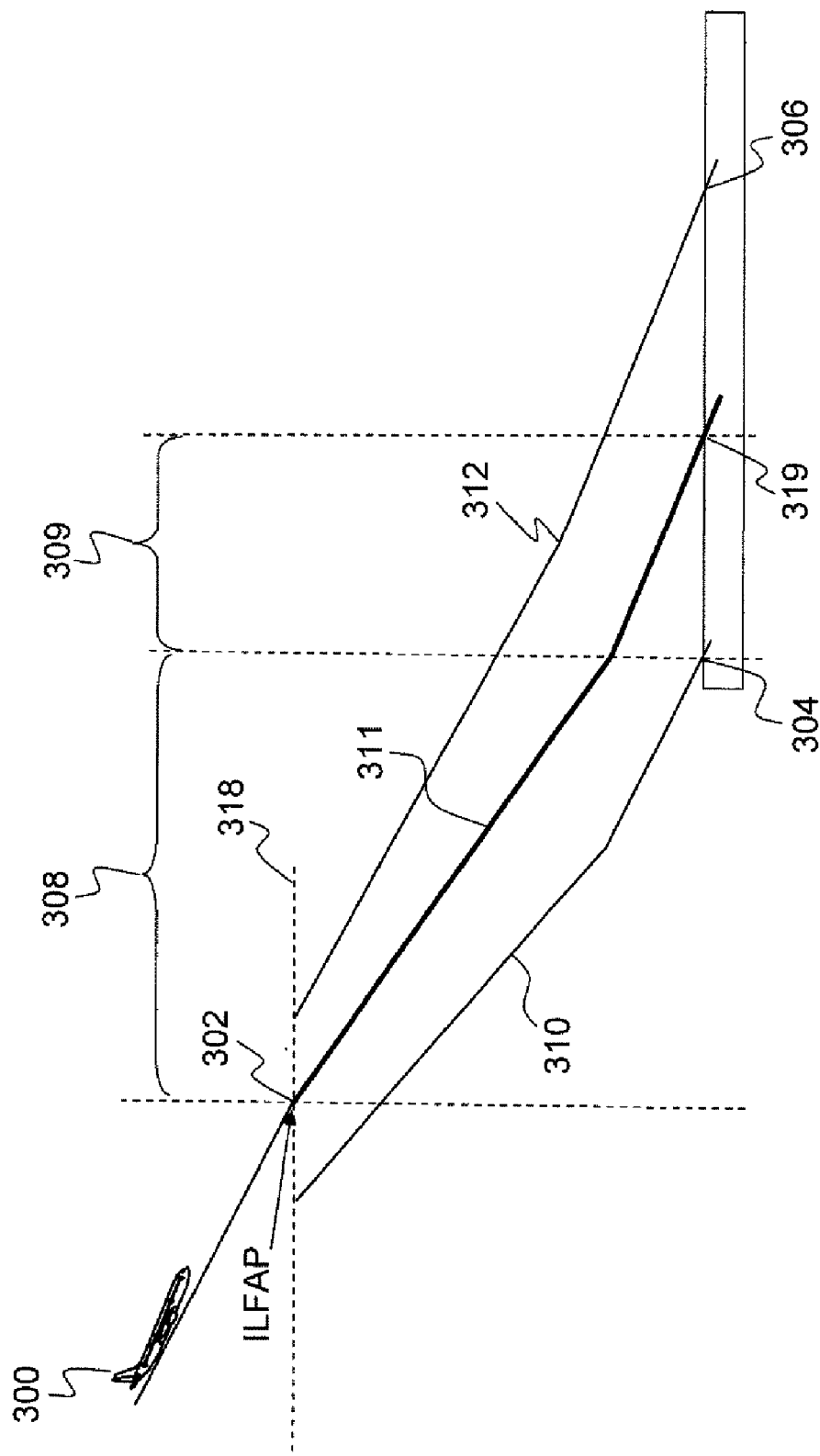
FIG. 3 presents a second exemplary approach trajectory calculated with the method according to the invention.

FIG. 3 represents a second exemplary approach trajectory calculated with the method according to the invention. This calculation is used when, contrary to the example of FIG. 2, the intersection is nonexistent or above an effective maximum height of thrust reduction to fully reduced. The approach trajectory comprises a final approach segment 308 and a landing segment preparing for go-around 309. The intersection between the descent trajectory 310 at reduced engine revs with a maximum wind, having the minimum impact point 304 as point of impact with the runway, and the descent trajectory 312 at reduced engine revs with a minimum wind, having the maximum impact point 306 as point of impact with the runway, occurs above a maximum height, with respect to the terrain, Hm of thrust reduction. The point of switchover 302 to reduced engine revs is calculated as the intersection between:
  a horizontal straight line 318 situated at the maximum height of reduction and,
  a descent trajectory 311 taking account of the approach speed profile and also of wind information, having a middle impact point 319 as point of impact with the runway, the middle impact point 319 possibly being situated midway from the points of minimum 304 and maximum 306 impact or else calculated between these points of minimum and maximum impact as a function of the mean value of the wind gusts if it has been possible to calculate this mean, for example over a time history of the order of some thirty seconds.

The point of switchover 202, 302 to reduced engine revs is also named ILFAP (Idle Landing Final Approach Point).

The maximum height of reduction Hm is limited to a maximum of 1500 to 3000 feet (to be adjusted locally depending on the landing conditions, notably the obstacles and the type of approach) since at a greater height, the noise reduction on the ground is not noticeable and this implies too large an uncertainty in the impact point (related to the larger variability of the wind). Specifically, the principle being to no longer control a landing trajectory, a possible deviation arises with respect to the initially envisaged trajectory which varies all the more in wind and if the thrust is reduced early. The speed slaving is held very precisely by virtue of the elevator, situated at the rear of the aircraft, while the reduced revs or the go-around preparation revs are ensured by the auto-throttle which controls the engines.

Thus, the calculation sequence is as follows:
  definition of the maximum height of reduction Hm,
  calculation of the extreme limit impact point on the runway dependent on the conditions of the day described as above
  calculation of the minimum impact point,
  calculation of the maximum impact point deduced as above,
  calculation of the middle impact point if necessary,
  calculation of the ILFAP point (Idle Landing Final Approach Point) calculated as the intersection of the impact trajectories with maximum and minimum wind, limited to the maximum height Hm of Idle reduction,
  periodic calculation of a final approach trajectory 211 and of a nominal impact point ensuing from ILFAP and the landing conditions propagated up to the runway with display of this point on a head-up display (HUD).

The method according to the invention furthermore comprises a step of automatic monitoring of the position of the impact point 205 on the runway.

The monitoring of landing evaluates in real time the position and the energy of the impact as the wheels touch down by considering the position and current speed of the aircraft, propagated up to the runway with the conditions regarding wind and current aircraft performance.

If the impact position exits the safe impact zone 215, or if the speed at the impact point is incompatible with a speed reduction before the end of the runway or before the exit point on the runway, then an alarm may be triggered (visual and/or audible alarm) with active preparation of the aeroplane for go-around. The decision to land or go-around always remains up to the pilot. This alarm can be supplemented in an advantageous manner by continuous display of the impact point for example on a head-up display HUD.

In an advantageous manner, the method according to the invention furthermore comprises a step of determining the type of landing as a function of the aircraft, the characteristics of the runway and the meteorological conditions, making it possible to know whether the landing comprises a precision approach or a non-precision approach.

The non-precision approach, designated by the expression RNAV approach, is characterized by a geometric trajectory in three dimensions up to a so-called decision height or altitude below which a landing is performed either by sight manually or automatically by instruments (performed with a reference trajectory calculated by the FMS, this approach principle exists today on the Airbus aeroplane under the name FLS the acronym standing for the expression "FMS Landing System").

The proposed approach ("Idle landing") is comparable to an FLS approach except from the point of switchover 202 to reduced engine revs where the aircraft is no longer slaved to a trajectory and speed pair but to a speed and reduced thrust pair.

A precision approach is generally used when the weather minima do not make it possible to do otherwise. The use of a precision approach such as this makes it possible to take the final landing decision at lower decision heights than normal, so as to limit the number of cases where an expensive go-around is required.

Currently no precision approach is performed without ground landing means (landing beams originating from ground beacons) which are by nature expensive. It is therefore commercially impossible today to make precision approaches (ILS type) with a different slope from the current 3° (approximately).

In the long-term however, it will be possible to generalize approaches to higher slope, either by installing ground guidance systems (ILS/MLS type) with higher calibrated slopes, or by approaches termed "autonomous" (GBAS or SBAS approaches based on GPS/GNSS technology).

However, if it were possible to have a precision landing system carry out guidance on beams of different slope and especially whose slope is requested by the aircraft, then it would be possible to use the method according to the invention for a precision approach. In this case it would be necessary to have an independent guidance system that is made redundant for each aircraft since each aircraft has its ideal slope at reduced revs.

In an advantageous manner, the method according to the invention furthermore comprises a step of automatic guidance about the approach trajectory. This function is carried out either within the framework of a non-precision approach by guidance about the profile by the FMS (FLS type guidance), or for a precision approach with conventional ground aids if they are available in the prior art.

Figure 4:
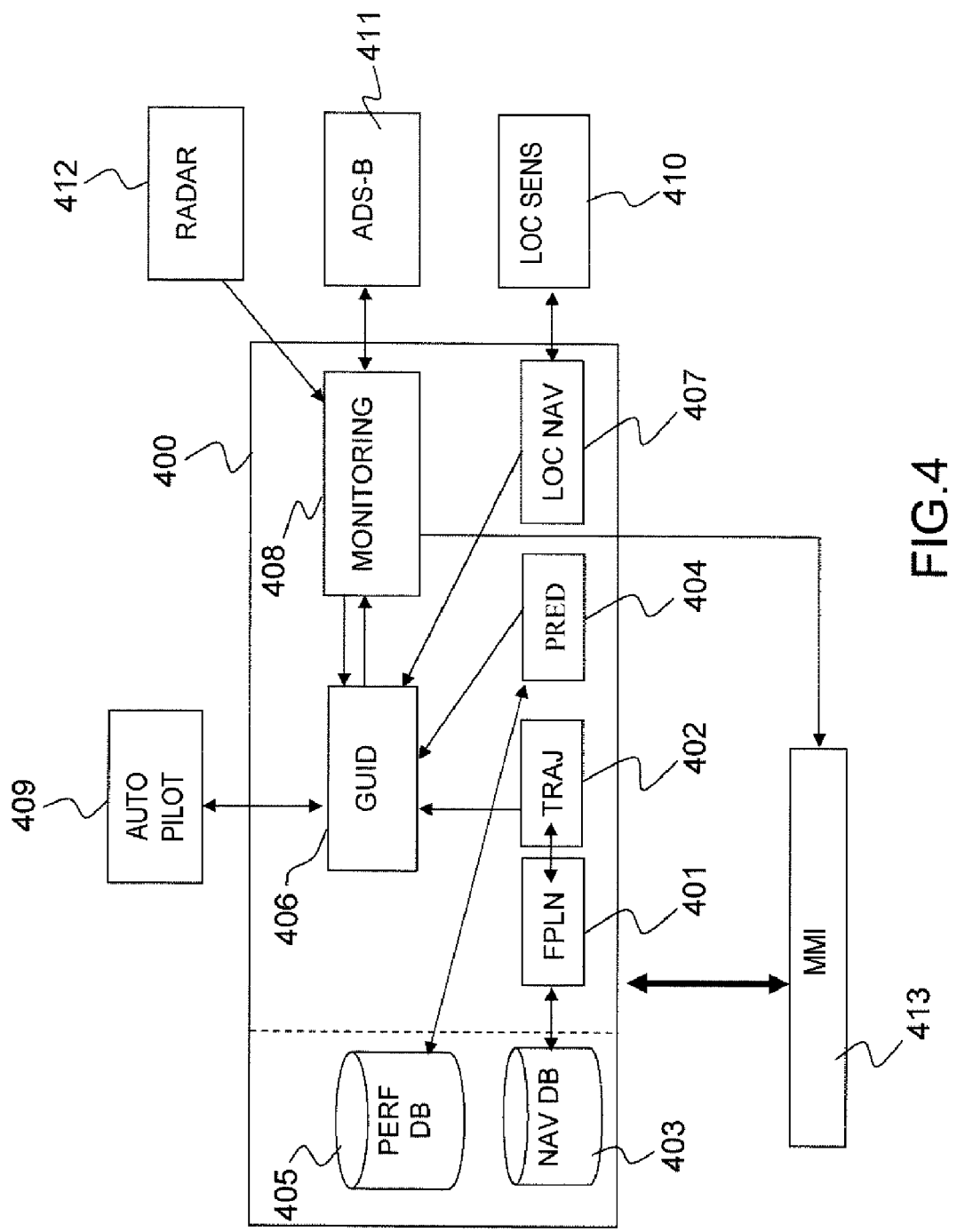
FIG. 4 represents an exemplary FMS architecture according to the known art.

FIG. 4 represents an exemplary FMS architecture according to the known art.

Generally, an FMS architecture 400 comprises a set of functions and a set of databases such as context monitoring 408, guidance 406, predictions 404 notably regarding flight time and fuel consumption, flight plan 401 consisting of a series of points and of segments linking them, calculation of the trajectory 402 on the basis of the elements of the flight plan and setpoints for tracking the flight plan and location 407. The set of databases comprises notably a navigation database 403 and a performance database 405 containing various characteristics and limits of the aircraft.

The FMS 400 is interfaced with an automatic pilot 409, sensors 410 for location, a digital link 411 with other aeroplanes called the ADS-B standing for Automatic Dependent Surveillance Broadcast, and a weather radar 412. The FMS can be controlled by a man-machine interface 413 comprising notably screens and keyboards.

An exemplary embodiment of the method according to the invention in the architecture presented is distributed around the functions of context monitoring 408, guidance 406 and trajectory calculation 402.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for calculating an approach trajectory of an aircraft to a runway of an airport, the aircraft being controlled in terms of trajectory flight path angle and speed, in terms of trajectory flight path angle and thrust or in terms of thrust and speed, the aircraft being able to fly at reduced engine thrust, the descent/approach trajectory terminating in an impact point on the runway and comprising
    a high-altitude descent segment constructed on the basis of an idle thrust and speed setpoint,
    an intermediate geometric segment constructed on the basis of speed and slope setpoints appending altitude constraints, to which the aircraft is controlled in terms of trajectory flight path angle and thrust and then in terms of trajectory flight path angle and speed,
said method comprising the following steps:
    calculating a final approach segment at reduced idle engine thrust and a landing segment with adequate thrust for preparing a possible go-around, to which the aircraft is controlled in terms of thrust and speed, wherein the landing segment has a slope of trajectory less than a slope of trajectory of the final approach segment and the landing segment performed with engine thrust greater than the reduced engine thrust;
    calculating a maximum impact point, the runway comprising an extreme limit point, the extreme limit point being defined as the most distant impact point on the runway in the direction of landing in service below which the aircraft lands, brakes and disengages the runway without risk, the maximum impact point being situated on the runway upstream of the extreme limit point at a safety distance; and calculating a point of switchover to reduced engine thrust, the aircraft flying under meteorological conditions defined by a maximum wind and a minimum wind, the point of switchover to reduced engine thrust being defined by the intersection between:

a descent trajectory at reduced engine thrust with the maximum wind and according to the approach speed suited to the maximum wind, having the minimum impact point as point of impact with the runway, and a descent trajectory at reduced engine thrust with the minimum wind and according to the approach speed suited to the minimum wind, having the maximum impact point as point of impact with the runway.

2. The method for calculating an approach trajectory according to claim 1, comprising a step of automatic monitoring of a position of the impact point on the runway, said step comprising:

real-time evaluation of the position and speed of the impact as a function of the position and current speed of the aircraft, propagated up to the runway with conditions regarding wind, mode of guidance and current and envisaged aircraft performance, including at least one of variations in speed and in configuration of slats, flaps and undercarriage with a view to landing.

3. The method for calculating an approach trajectory according to claim 1, comprising a step of calculating a minimum impact point, the runway comprising a runway threshold, the runway threshold being a limit point onwards of which the aircraft can land without risk, the minimum impact point being positioned beyond the runway threshold at a safety distance.

4. The method for calculating an approach trajectory according to claim 3, comprising a step of emitting an alarm for a crew of the aircraft when the impact point exits a safe zone or if a speed of the aircraft does not make it possible to disengage the runway in safety under current braking conditions, the safe zone being defined between the points of minimum and maximum impact and in that it furthermore comprises active preparation of the aircraft for the possible go-around.

5. The method for calculating an approach trajectory according to claim 1, wherein when the point of switchover to reduced engine thrust cannot be calculated or exceeds a maximum height of reduction, the point of switchover is positioned at the intersection between:

a horizontal straight line situated at the maximum height of reduction and, a descent trajectory taking account of the approach speed profile and also of wind information, having a middle impact point as point of impact with the runway, the middle impact point being situated midway from the points of minimum and maximum impact or being calculated between the points of minimum and maximum impact as a function of a mean value of wind gusts if it has been possible to calculate the mean value according to a short time history.

6. The method for calculating an approach trajectory according to claim 1, comprising a step of calculating a go-around preparation point placed towards the end of the final approach segment.

7. The method for calculating an approach trajectory according to claim 1, comprising a step of automatic guidance about the approach trajectory.

8. The method for calculating an approach trajectory according to claim 1, comprising a step of determining a type of landing as a function of the aircraft, characteristics of the runway, a presence of obstacles and the meteorological conditions, making it possible to know whether the landing comprises a precision approach or a non-precision approach.

9. The method for calculating an approach trajectory according to claim 2, comprising a step of calculating a minimum impact point, the runway comprising a runway threshold, the runway threshold being a limit point onwards of which the aircraft can land without risk, the minimum impact point being positioned beyond the runway threshold at a safety distance.

10. The method for calculating an approach trajectory according to claim 1, comprising a step of emitting an alarm for a crew of the aircraft when the impact point exits a safe zone or if a speed of the aircraft does not make it possible to disengage the runway in safety under current braking conditions, the safe zone being defined between the points of minimum and maximum impact and in that the method furthermore comprises active preparation of the aircraft for the possible go-around.

11. The method for calculating an approach trajectory according to claim 4, comprising a step of calculating a point of switchover to reduced engine thrust, the aircraft advancing under meteorological conditions defined by a maximum wind and a minimum wind, the point of switchover to reduced engine thrust being defined by the intersection between:

a descent trajectory at reduced engine thrust with the maximum wind and according to the approach speed suited to the maximum wind, having the minimum impact point as point of impact with the runway and, a descent trajectory at reduced engine thrust with the minimum wind and according to the approach speed suited to the minimum wind, having the maximum impact point as point of impact with the runway.

12. The method for calculating an approach trajectory according to claim 2, comprising a step of calculating a go-around preparation point placed towards the end of the final approach segment.

13. The method for calculating an approach trajectory according to claim 3, comprising a step of calculating a go-around preparation point placed towards the end of the final approach segment.

14. The method for calculating an approach trajectory according to claim 4, comprising a step of calculating a go-around preparation point placed towards the end of the final approach segment.

* * * * *